US008520790B2

(12) United States Patent
Lu

(10) Patent No.: US 8,520,790 B2
(45) Date of Patent: Aug. 27, 2013

(54) FRAME SYNCHRONIZATION APPARATUS AND METHOD BASED ON DIFFERENTIAL CORRELATION IN COMMUNICATION SYSTEM

(75) Inventor: Keng-Chih Lu, Taipei County (TW)

(73) Assignee: Novatek Microelectronics Corp., Hsinchu (TW)

( * ) Notice: Subject to any disclaimer, the term of this patent is extended or adjusted under 35 U.S.C. 154(b) by 573 days.

(21) Appl. No.: 12/772,235

(22) Filed: May 3, 2010

(65) Prior Publication Data

US 2011/0249777 A1 Oct. 13, 2011

(30) Foreign Application Priority Data

Apr. 7, 2010 (TW) ................................ 99110757 A

(51) Int. Cl.
*H04L 7/00* (2006.01)

(52) U.S. Cl.
USPC ............................. 375/355; 375/316; 375/343

(58) Field of Classification Search
USPC ................... 375/316, 343, 354, 355
See application file for complete search history.

(56) References Cited

U.S. PATENT DOCUMENTS

| 7,308,064 B2 | 12/2007 | Kim et al. | |
|---|---|---|---|
| 8,085,818 B2 * | 12/2011 | Kim et al. | 370/509 |
| 2007/0058758 A1 * | 3/2007 | Ishii | 375/343 |
| 2010/0007743 A1 | 1/2010 | Kim et al. | |
| 2010/0135362 A1 * | 6/2010 | Park et al. | 375/145 |
| 2010/0150054 A1 * | 6/2010 | Becker et al. | 370/316 |
| 2011/0002418 A1 * | 1/2011 | Chen et al. | 375/340 |

FOREIGN PATENT DOCUMENTS

| CN | 101640790 | 2/2010 |
|---|---|---|
| WO | 2009045244 | 4/2009 |

OTHER PUBLICATIONS

Authored by Sun, et al., article titled "Frame synchronization and pilot structure for second generation DVB via satellites," adopted from International Journal of Satellite Communications and Networking, 2004, vol. 22 pp. 319-339.
"Office Action of Taiwan Counterpart Application", issued on Mar. 25, 2013, p. 1-p. 5, in which the listed references were cited.
"First Office Action of China Counterpart Application", issued on Apr. 22, 2013, p1-p7, in which the listed reference was cited.

* cited by examiner

*Primary Examiner* — Chieh M Fan
*Assistant Examiner* — Freshteh N Aghdam
(74) *Attorney, Agent, or Firm* — Jianq Chyun IP Office

(57) ABSTRACT

A frame synchronization apparatus and method based on differential correlation in a communication system are provided. A correlation analysis is performed by using sync word in a prior search window and a posterior search window for obtaining a plurality of prior-window correlation values and a plurality of posterior-window correlation values, respectively. N maximum correlation values in the correlation values are selected, wherein indexes of the maximum correlation values are $I_1 \sim I_N$, and N is an integer greater than 0. The posterior-window correlation values are compared with a first threshold. If one of the posterior-window correlation values is greater than the first threshold, the index of the one is defined as J. If the index J is equal to one of the index $I_1 \sim I_N$, a check step is performed by using the index J for confirming that a position of the index J is a header position.

9 Claims, 7 Drawing Sheets

FRAME SYNCHRONIZATION APPARATUS AND METHOD BASED ON DIFFERENTIAL CORRELATION IN COMMUNICATION SYSTEM

CROSS-REFERENCE TO RELATED APPLICATION

This application claims the priority benefit of Taiwan application serial no. 99110757, filed on Apr. 7, 2010. The entirety the above-mentioned patent application is hereby incorporated by reference herein and made a part of specification.

BACKGROUND OF THE INVENTION

1. Field of the Invention

The present invention relates to a communication system. More particularly, the present invention relates to a frame synchronization apparatus and a method based on differential correlation.

2. Description of Related Art

A communication system (for example, a digital video broadcasting-satellite (DVB-S) or a second generation system of digital video broadcasting-satellite (DVB-S2)) can use different frame types. A frame synchronization apparatus of the communication system is used for detecting a position of a physical layer frame header (PLHeader), so as to facilitate operations of a follow-up frequency offset correction and a forward error correction (FEC) decoder. Different to the DVB-S, a frame length of the DVB-S2 is longer, and a signal to noise ratio (SNR) is lower. Taking a frame type with pilot quaternary phase shift keying (QPSK) as an example, a frame length thereof is 33282 symbols, and a SNR thereof is −2.35 dB (for ¼ code rate). Therefore, it is important to use the DVB-S2 frame structure to quickly lock the position of the PLHeader.

For example, according to an article "Frame Synchronization and Pilot Structure for Second Generation DVB via Satellite" (International Journal of Satellite Communications and Networking, 2004; 22:319-339) authored by Sun Jian and Lee et al., a plurality of correlation values are calculated in search windows, and maximum correlation values are obtained from the correlation values. Assuming a length of a T-th search window $W_{K,T}$ of a K-th frame type is $L_K$, according to such conventional technique, a sync word is used to perform a differential detection to each of the symbols, so as to obtain a maximum index $I_{K,T}$ from the correlation values of the search window $W_{K,T}$. Such method is repeated to obtain the maximum indexes $I_{K,T}, I_{K,T+1}, I_{K,T+2}, \ldots$ of the correlation values of a plurality of consecutive search windows $W_{K,T}, W_{K,T+1}, W_{K,T+2}, \ldots$. If $I_{K,T}=I_{K,T+1}=I_{K,T+2}=\ldots$, it can be determined that the corresponding position of each of the indexes $I_{K,T}, I_{K,T+1}, I_{K,T+2}$ is the header position, i.e. the position of the PLHeader. However, in the conventional technique, the pilot information is not used, and a chance of miss-detection is excessively high in case of a low noise, which may lead to a longer synchronization time.

According to a U.S. Pat. No. 7,308,064, steps of "sync word correlation" and "multi-step correlation test" are used to search the position of the PLHeader. In the step of "sync word correlation", as long as the correlation value of the PLHeader is greater than a threshold $\Gamma_1$, the step "multi-step correlation test" is executed. In the step "multi-step correlation test", if a pilot correlation value is greater than a threshold $\Gamma_2$, a number of successful detection I is accumulated by 1 (i.e. I=I+1), and when $I=P_N$, the synchronization is determined to be successful. However, in the step of "sync word correlation", the determination performed by using the threshold can cause a false-alarm in case of a low SNR. In the step of "multi-step correlation test", determination is performed to each of the pilots, though a large $P_N$ can cause the miss-detection and a small $P_N$ can cause the false-alarm. Moreover, in such conventional technique, a spectrum inversion phenomenon in a satellite channel is not considered, so that the step of "multi-step correlation test" can be failed in case of the spectrum inversion phenomenon. In addition, a non-pilot frame is not considered in the conventional technique.

SUMMARY OF THE INVENTION

The present invention is directed to a frame synchronization apparatus and a method based on differential correlation in a communication system, by which a header position can be quickly searched.

The present invention provides a frame synchronization method, which can be described as follows. A correlation analysis is performed by using a sync word in a prior search window and a posterior search window for respectively obtaining a plurality of prior-window correlation values and a plurality of posterior-window correlation values. N maximum correlation values are selected from the prior-window correlation values, wherein indexes of the maximum correlation values are $I_1$-$I_N$, and N is an integer greater than 0. The posterior-window correlation values are compared to a first threshold. If one of the posterior-window correlation values is greater than the first threshold, an index of the posterior-window correlation value is defined as J. If the index J is equal to one of the indexes $I_1$-$I_N$, the index J is used to perform a check step, so as to confirm that a position of the index J is a header position.

The present invention provides a frame synchronization apparatus including a differential detector and a frame searching unit. The differential detector receives a baseband signal, and performs a correlation analysis by using a sync word in a prior search window and a posterior search window for respectively obtaining a plurality of prior-window correlation values and a plurality of posterior-window correlation values. The frame searching unit selects N maximum correlation values from the prior-window correlation values, wherein indexes of the maximum correlation values are $I_1$-$I_N$, and N is an integer greater than 0. The frame searching unit compares the posterior-window correlation values to a first threshold. If one of the posterior-window correlation values is greater than the first threshold, an index of the posterior-window correlation value is defined as J. The frame searching unit determine whether the index J is equal to one of the indexes $I_1$-$I_N$. Wherein, the frame searching unit includes a check step unit. If the index J is equal to one of the indexes $I_1$-$I_N$, the check step unit uses the index J to confirm that a position of the index J is a header position.

According to the above descriptions, in the present invention, one or multiple maximum correlation values are searched from the prior search window, and the correlation value greater than the first threshold is obtained from the posterior search window. Then, indexes $I_1$-$I_N$ of the maximum prior-window correlation values are compared to the index J of the posterior-window correlation value greater than the first threshold. According to a relationship of the indexes J and $I_1$-$I_N$, the header position can be quickly searched. Then, the index J is used to perform a check step, so as to confirm that a position of the index J is the header position.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
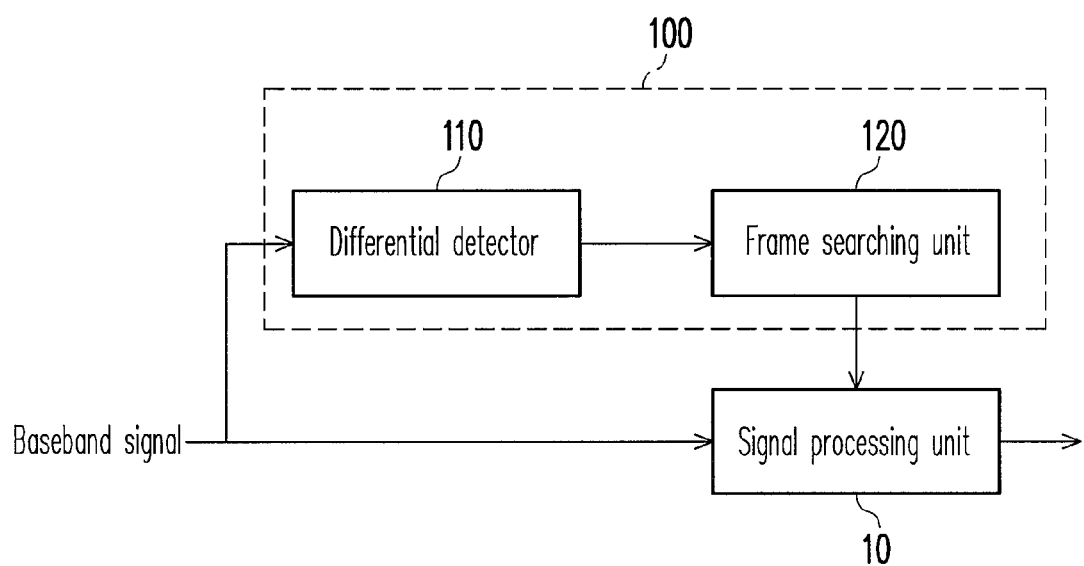
FIG. 1 is a schematic diagram illustrating a frame synchronization apparatus based on differential correlation in a communication system according to an embodiment of the present invention.

FIG. 1 is a schematic diagram illustrating a frame synchronization apparatus 100 based on differential correlation in a communication system (for example, digital video broadcasting-satellite (DVB-S) or a second generation system of digital video broadcasting-satellite (DVB-S2)) according to an embodiment of the present invention. The frame synchronization apparatus 100 searches a frame header in a basband signal, and notifies a header position to a signal processing unit 10 to complete frame synchronization. The signal processing unit 10 can perform follow-up operations such as a frequency offset correction and/or a forward error correction (FEC) decoding, etc. to the baseband signal according to the header position provided by the frame synchronization apparatus 100. The frame synchronization apparatus 100 includes a differential detector 110 and a frame searching unit 120.

Figure 2:
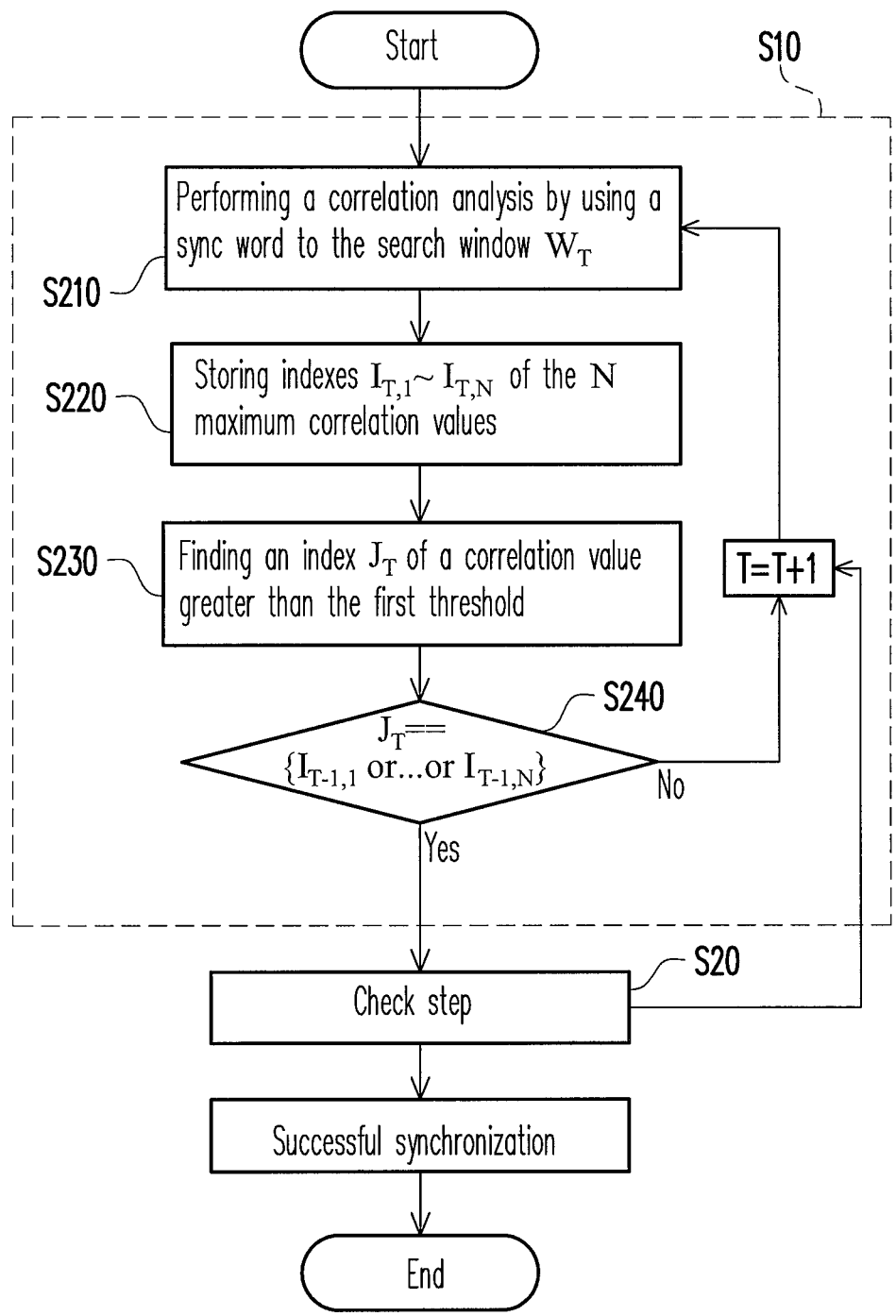
FIG. 2 is a flowchart illustrating a frame synchronization method based on differential correlation in a communication system according to an embodiment of the present invention.

FIG. 2 is a flowchart illustrating a frame synchronization method based on differential correlation in a communication system according to an embodiment of the present invention. Referring to FIG. 1 and FIG. 2, the frame synchronization method can be divided into two parts of an acquisition step S10 and a check step S20. In the acquisition step S10, a T-th search window is defined as $W_T$, wherein a length of each search window $W_T$ is L, a time index in the search window is defined as I, and a correlation value of a physical layer frame header (PLHeader) of the T-th search window is defined as $\Gamma_{T,I}$. N maximum correlation values are obtained from the correlation values of the search window $W_{T-1}$, and indexes there of are stored as $I_{T-1,1}, \ldots I_{T-1,N}$. Assuming an index of the correlation value in the search window $W_T$ that is greater than a first threshold $C_{TH1}$ is defined as J, if the index J is complied with a following condition:

$(J==I_{T-1,1})$ or $(J==I_{T-1,2})$ or ... or $(J==I_{T-1,N})$, the check step S20 is started.

Figure 3:
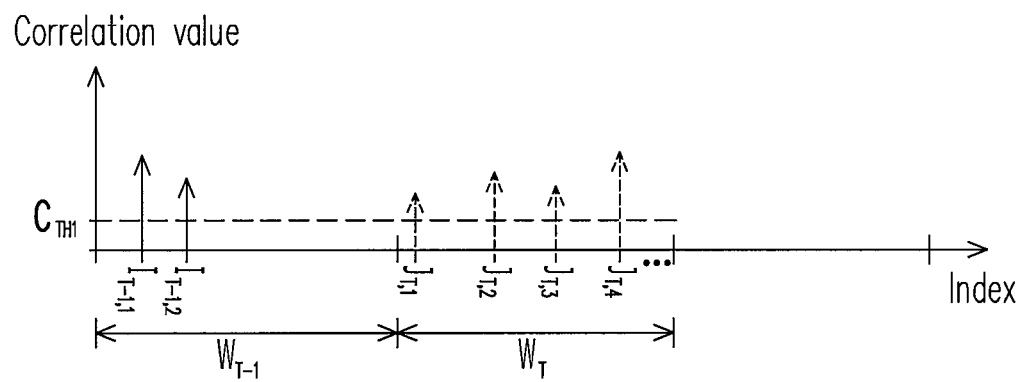
FIG. 3 is a schematic diagram illustrating a relationship between correlation values and time indexes according to an embodiment of the present invention.

For example, FIG. 3 is a schematic diagram illustrating a relationship between correlation values and time indexes according to an embodiment of the present invention. The differential detector 110 receives the baseband signal, and uses a sync word to perform a correlation analysis to the baseband signal in the prior search window $W_{T-1}$ and the posterior search window $W_T$ for respectively obtaining a plurality of prior-window correlation values and a plurality of posterior-window correlation values (step S210). In some embodiments, the prior search window $W_{T-1}$ and the posterior search window $W_T$ can be two search windows that are not adjacent to each other on timing. In the present embodiment, the differential detector 110 can be implemented by any approach according to an actual design requirement. For example, the differential detector 110 can be implemented according to a technique described in a user guidelines C3.1 chapter (page 77-page 78) in second generation system of digital video broadcasting (DVB-S2) of an ETSI TR 102 376 V1.1.1 standard specification manual.

The frame searching unit 120 is coupled to the differential detector 110, and is used for receiving a plurality of correlation values. The frame searching unit 120 selects N maximum correlation values from the correlation values of the prior search window $W_{T-1}$ (i.e. the prior-window correlation values) for storage, wherein indexes of the maximum correlation values are $I_1$-$I_N$, and N is an integer greater than 0 (step S220). A value of N is determined according to an actual design requirement, for example, N=2. Only two maximum correlation values of the prior search window $W_{T-1}$ are illustrated in FIG. 3, and indexes of the two maximum correlation values are respectively represented by $I_{T-1,1}$ and $I_{T-1,2}$, which represents that the two indexes $I_1$ and $I_2$ are indexes of a (T−1)-th search window $W_{T-1}$.

Next, the frame searching unit 120 compares the correlation values of the posterior search window $W_T$ (i.e. the posterior-window correlation values) to the first threshold $C_{TH1}$ (step S230). If one of the posterior-window correlation values is greater than the first threshold $C_{TH1}$, an index of the posterior-window correlation value is defined as J. If the index J is equal to one of the indexes $I_1$-$I_N$ (step S240), the frame searching unit 120 uses the index J to perform the check step S20, so as to confirm that a position of the index J is a header position. Conversely, if all of the indexes J of the search window $W_T$ are not complied with the judgement condition of the step S240, the frame searching unit 120 searches a plurality of correlation values of a next search window $W_{T+1}$ according to the same method described as above.

Taking FIG. 3 as an example, the differential detector 110 sequentially outputs a string of the correlation values, so that the frame searching unit 120 can store the indexes $I_{T-1,1}$ and $I_{T-1,2}$ of the two maximum correlation values during the prior search window $W_{T-1}$. As the differential detector 110 sequentially outputs the string of the correlation values, the frame searching unit 120 can obtain a first correlation value (an index thereof is represented by $J_{T,1}$) greater than the first threshold CTH1 during the search window $W_T$. Since the index $J_{T,1}$ is neither equal to the index $I_{T-1,1}$ nor equal to the index $I_{T-1,2}$, it is determined that a corresponding position of the index $J_{T,1}$ is not the header position. Therefore, the frame searching unit 120 abandons the index $J_{T,1}$ and obtains a second correlation value (an index thereof is represented by $J_{T,2}$) greater than the first threshold CTH1. Since the index $J_{T,2}$ is equal to the index $I_{T-1,2}$, it represents that a corresponding position of the index $J_{T,2}$ has a high possibility to be the header position. Therefore, the frame searching unit 120 uses the index $J_{T,2}$ to perform the check step S20, so as to confirm whether the corresponding position of the index $J_{T,2}$ is the header position.

Figure 4:
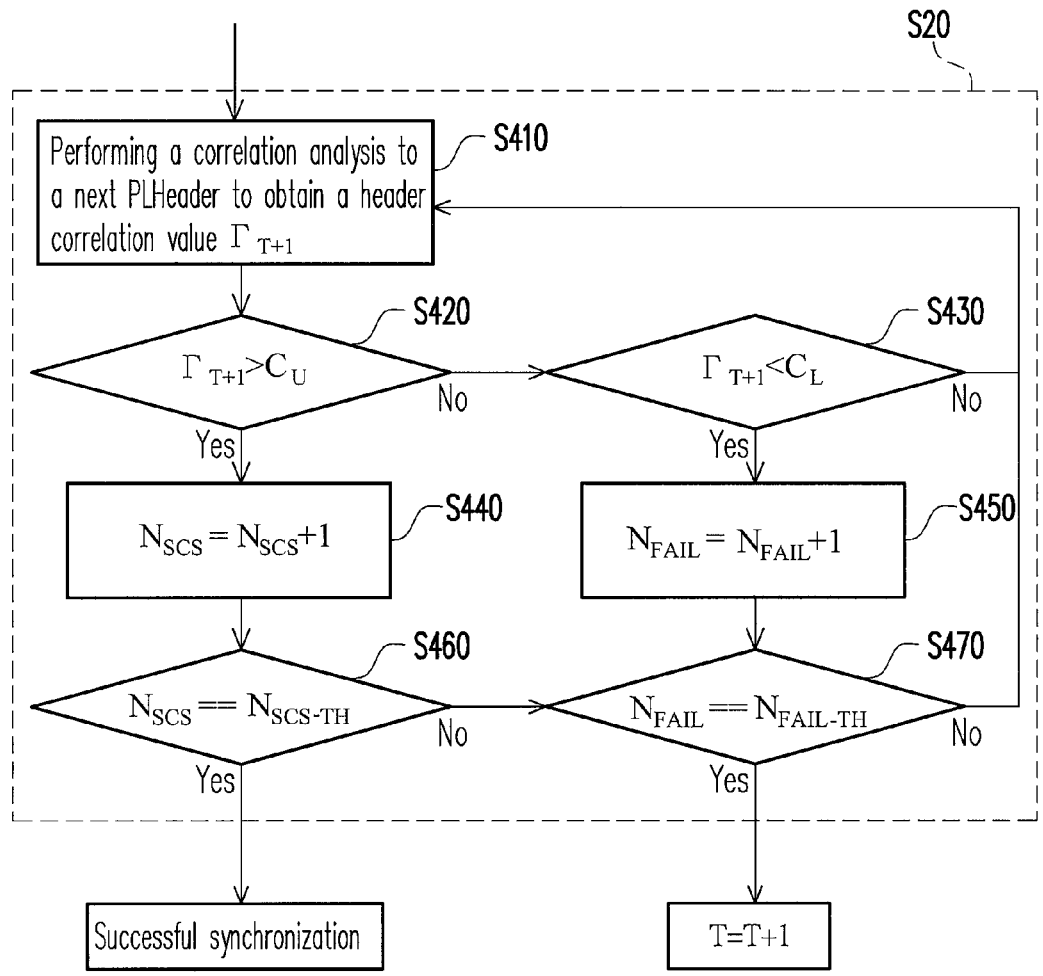
FIG. 4 is a detailed flowchart of a check step S20 of FIG. 2 according to an embodiment of the present invention.

According to the check step S20, a synchronization speed can be increased in case of a low signal to noise ratio (SNR), and a chance of miss-detection can be reduced. In the check step S20, the check step can be performed in allusion to a frame type with a pilot and a frame type without the pilot. Implementation of the check step S20 in case that the baseband signal frame does not contain the pilot is described below. FIG. 4 is a detailed flowchart of the check step S20 of FIG. 2 according to an embodiment of the present invention. The check step S20 includes steps S410-S470. In the step S410, the frame searching unit 120 performs a correlation analysis to a next header (for example, the PLHeader) according to the index J, so as to obtain a header correlation value $\Gamma_{T+1}$. In detail, in the step S410, after L symbols from the position of the index J, the correlation analysis is performed by using the sync word, so as to obtain the header correlation value $\Gamma_{T+1}$, wherein L represents a length of the search window. In case of the example of FIG. 3, in the step S410, after L symbols from the position of the index $J_{T,2}$, the correlation analysis is performed by using the sync word, so as to obtain the header correlation value $\Gamma_{T+1}$. If the header correlation value $\Gamma_{T+1}$ is greater than a fourth threshold $C_U$ (step S420), a second counting value $N_{SCS}$ is accumulated by 1 (i.e. $N_{SCS}=N_{SCS}+1$, step S440). The second counting value $N_{SCS}$ represents a number of successful check.

If a determination result of the step S420 is negative, it is determined whether the header correlation value $\Gamma_{T+1}$ is less than a sixth threshold $C_L$ (step S430). The fourth threshold $C_U$ is greater than the sixth threshold $C_L$. If the header correlation value $\Gamma_{T+1}$ is between the fourth threshold $C_U$ and the sixth threshold $C_L$, the step S410 is repeated to perform the correlation analysis to a next header to obtain a next header correlation value $\Gamma_{T+2}$, and the above operations are repeated. If a determination result of the step S430 is "yes", a third counting value $N_{FAIL}$ is accumulated by 1 (i.e. $N_{FAIL}=N_{FAIL}+1$, step S450). The third counting value $N_{FAIL}$ represents a number of failed check.

In step S460, it is determined whether the second counting value $N_{SCS}$ is equal to a fifth threshold $N_{SCS-TH}$. If the second counting value $N_{SCS}$ reaches the fifth threshold $N_{SCS-TH}$, it is determined that the corresponding position of the index J is the header position. If a determination result of the step S460 is negative, it is determined whether the third counting value $N_{FAIL}$ reaches a seventh threshold $N_{FAIL-TH}$ (step S470). If the third counting value $N_{FAIL}$ reaches the seventh threshold $N_{FAIL-TH}$, it is determined that the corresponding position of the index J is not the header position. If the second counting value $N_{SCS}$ does not reach the fifth threshold $N_{SCS-TH}$, and the third counting value $N_{FAIL}$ does not reach the seventh threshold $N_{FAIL-TH}$, the step S410 is repeated to perform the correlation analysis to a next header to obtain the next header correlation value $\Gamma_{T+2}$, and the above operations are repeated.

After the L symbols, if the correlation value $\Gamma_{T,J}$ is greater than an upper threshold (the fourth threshold $C_U$), the number of the successful check is accumulated by 1 (i.e. $N_{SCS}=N_{SCS}+1$). Conversely, if the correlation value $\Gamma_{T,J}$ is less than a lower threshold (the sixth threshold $C_L$), the number of the failed check is accumulated by 1 (i.e. $N_{FAIL}=N_{FAIL}+1$). Setting of the upper and the lower thresholds $C_U$ and $C_L$ is for maintaining a non-decision area, so that in case of the low SNR, chances of miss-detection and false alarm can be simultaneously reduced.

Figure 5:
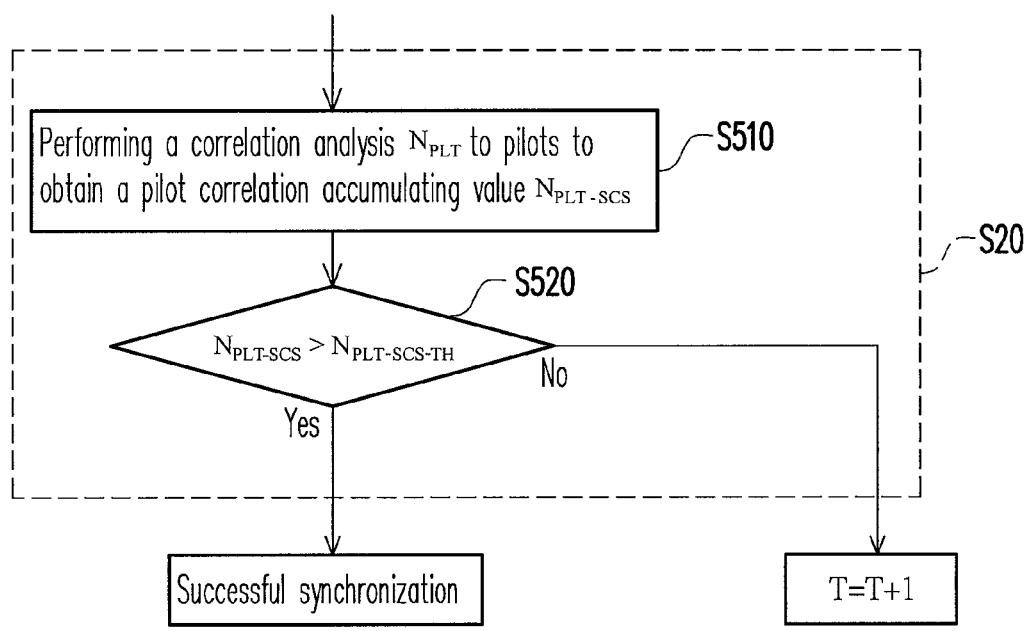
FIG. 5 is a detailed flowchart of a check step S20 of FIG. 2 according to another embodiment of the present invention.

Implementation of the check step S20 in case that the baseband signal frame contains the pilot is described below. FIG. 5 is a detailed flowchart of the check step S20 of FIG. 2 according to another embodiment of the present invention. The check step S20 includes steps S510 and S520. In the step S510, the frame searching unit 120 performs a correlation analysis to $N_{PLT}$ pilots in the posterior search window $W_T$ according to the index J, so as to obtain a pilot correlation accumulating value $N_{PLT-SCS}$. If the pilot correlation accumulating value $N_{PLT-SCS}$ reaches a third threshold $N_{PLT-SCS-TH}$ (step S520), it is determined that the corresponding position of the index J is the header position. For example, in case of the example of FIG. 3, the index J is $J_{T,2}$. Since a position of the pilot in the frame and a content of the pilot have been known, in the step S510, the frame searching unit 120 obtains one or a plurality of pilots backwards according to the position of the index $J_{T,2}$, and performs the correlation analysis to the pilots, and then a number of successful analysis (i.e. the pilot correlation accumulating value $N_{PLT-SCS}$) is accumulated. If the pilot correlation accumulating value $N_{PLT-SCS}$ is greater than the third threshold $N_{PLT-SCS-TH}$, the synchronization is determined to be successful. The $N_{PLT}$ is an adjustable parameter determined according to an actual design requirement. If the $N_{PLT}$ is increased, an accuracy of determination is increased, though a time required for the synchronization is prolonged.

Figure 6:
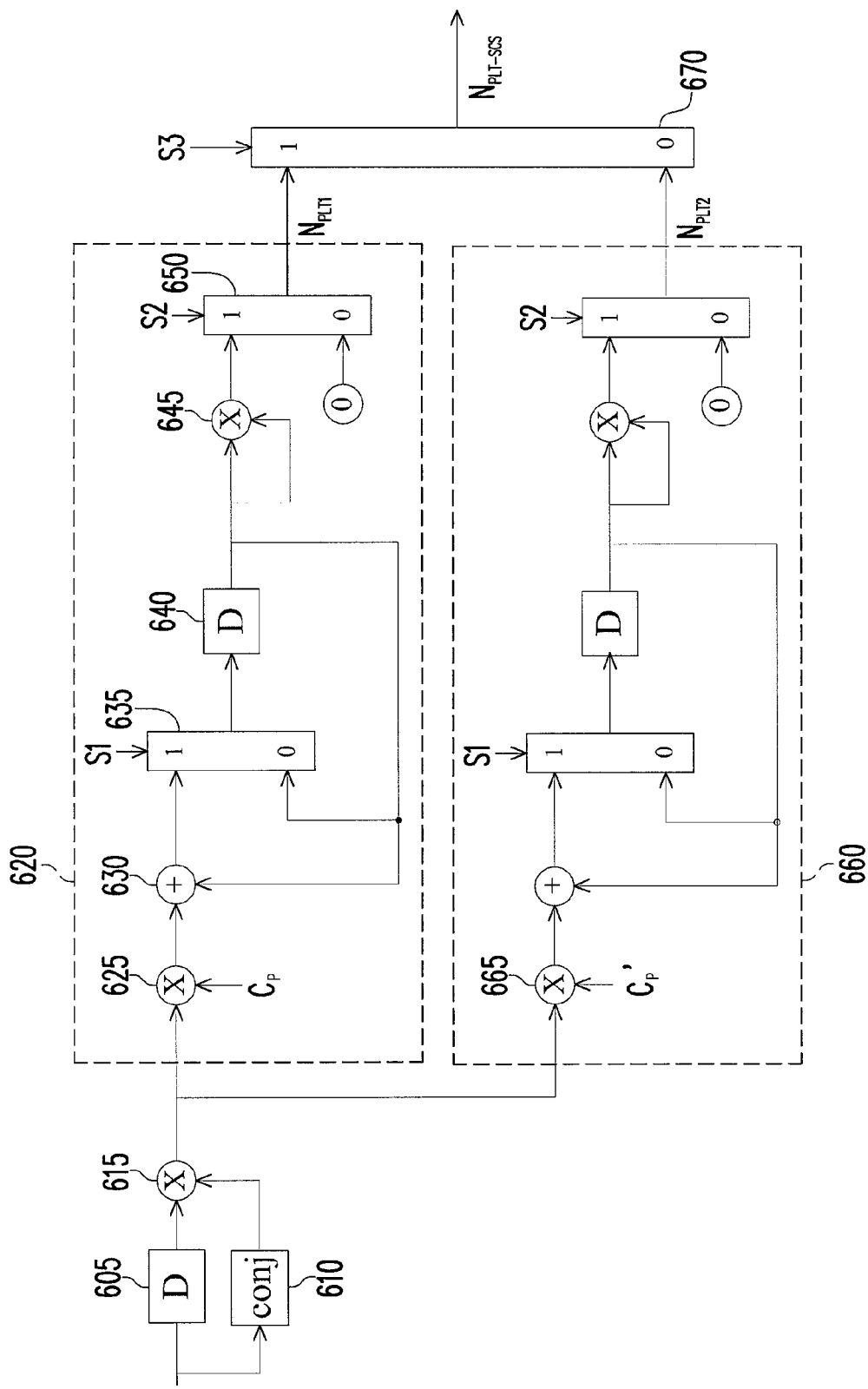
FIG. 6 is a check step unit performing a step S510 of FIG. 5 according to an embodiment of the present invention.

FIG. 6 is check step unit included in the frame searching unit 120. FIG. 6 is a schematic diagram of the step S510 of FIG. 5 according to an embodiment of the present invention. A first delayer 605 delays the baseband signal and transmits it to a first multiplier 615. A conjugator 610 outputs a conjugate complex of the baseband signal to the first multiplier 615. The first multiplier 615 receives the outputs of the first delayer 605 and the conjugator 610 and performing a multiplication operation. Implementations of first correlation analysis unit 620 and second correlation analysis unit 660 are similar. Considering a spectrum inversion phenomenon in a satellite channel, the second correlation analysis unit 660 is used for analysing the pilot of the spectrum inversion. A detailed implementation of the first correlation analysis unit 620 is described below, and the second correlation analysis unit 660 is similar to the first correlation analysis unit 620.

In the first correlation analysis unit 620, a second multiplier 625 multiplies an output of the first multiplier 615 with a coefficient Cp (i.e. a sample of the pilot), and outputs a correlation value to an adder 630. The adder 630 adds a correlation accumulating value output by a second delayer 640 with the correlation value output by the second multiplier 625, and then outputs a new correlation accumulating value to a first multiplexer 635. The first multiplexer 635 determines whether or not to transmit the new correlation accumulating value output by the adder 630 to the second delayer 640 according to a first control signal S1. Therefore, during a pilot period, the control signal S1 is set to 1, so that a correlation value of a pilot segment can be accumulated. During a non-pilot period, the control signal S1 is set to 0, so as to avoid adding a correlation value of a non-pilot signal into the correlation accumulating value. A third multiplier 645 calculates a square of the correlation accumulating value (or calculates an absolute value of the correlation accumulating value). A second multiplexer 650 determines whether or not to transmit the pilot correlation accumulating value output by the third multiplier 645 to a third multiplexer 670 according to a second control signal S2. The second control signal S2 relates to a number of the pilots $N_{PLT}$. After the correlation analysis of $N_{PLT}$ pilots are completed, the second control signal S2 is set to 1, so that the pilot correlation accumulating value $N_{PLT1}$ is transmitted to the third multiplexer 670.

The second correlation analysis unit 660 is similar to the first correlation analysis unit 620, and a difference there between is that in the second correlation analysis unit 660, a multiplier 665 receives a coefficient Cp' (i.e. a sample of the pilot after the spectrum inversion) instead of the coefficient Cp. Therefore, the second correlation analysis unit 660 can analyse the pilot of the spectrum inversion, and transmit a pilot correlation accumulating value $N_{PLT2}$ to the third multiplexer 670. When the pilot correlation accumulating value $N_{PLT1}$ is greater than the pilot correlation accumulating value $N_{PLT2}$, a control signal S3 is set to 1, and otherwise the control signal S3 is set to 0. Therefore, the third multiplexer 670 selects a greater one of the pilot correlation accumulating values $N_{PLT1}$ and $N_{PLT2}$, and outputs the greater one as the pilot correlation accumulating value $N_{PLT-SCS}$, so as to provide it to the step S520 of FIG. 5 of determination. Therefore, regardless of whether the spectrum inversion phenomenon is occurred, the step S510 can perform the correlation analysis to the pilots, and can accumulates the number of successful analysis (i.e. the pilot correlation accumulating signal $N_{PLT-SCS}$)

Figure 7:
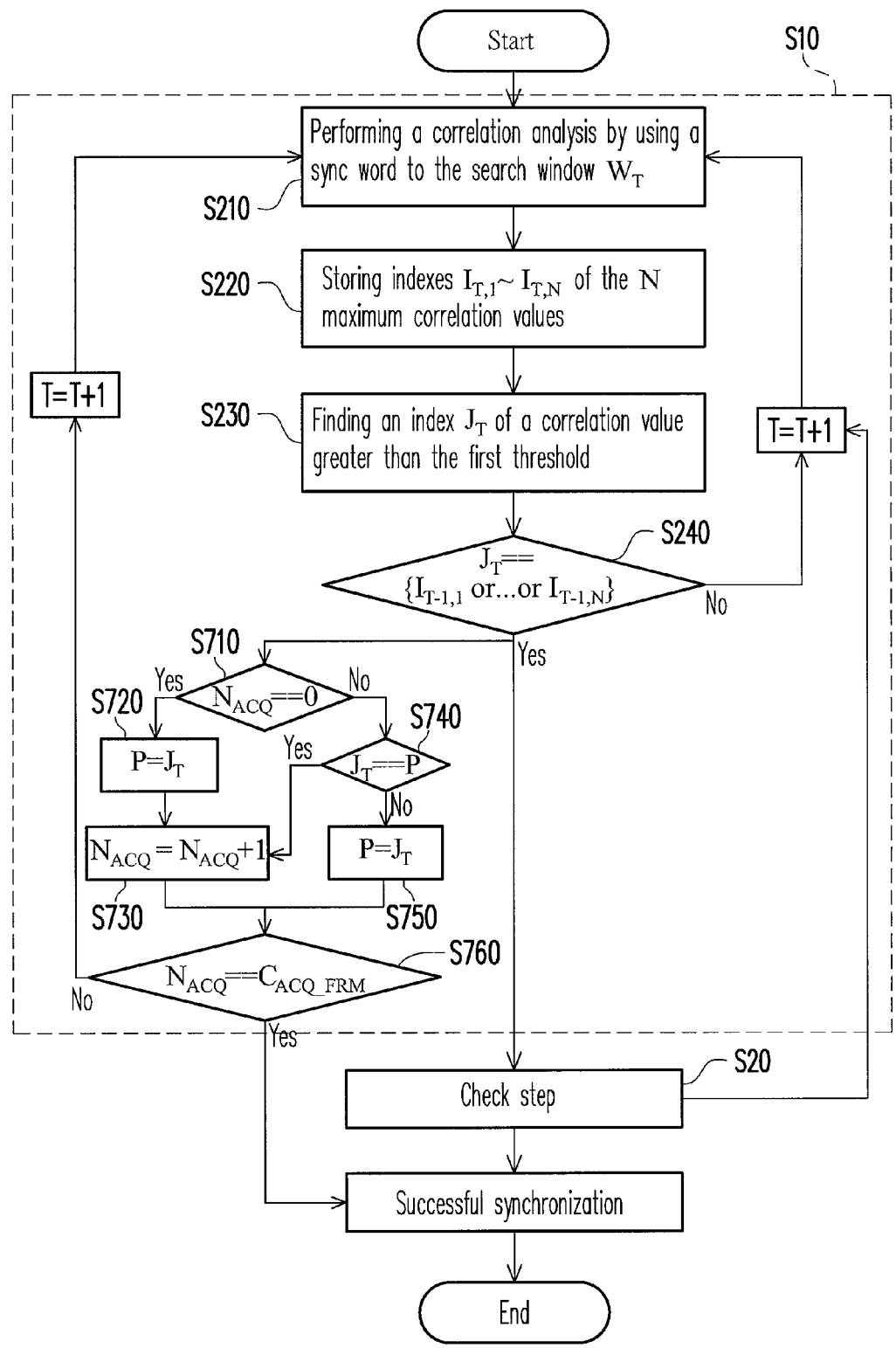
FIG. 7 is a flowchart illustrating a frame synchronization method based on differential correlation in a communication system according to another embodiment of the present invention.

FIG. 7 is a flowchart illustrating a frame synchronization method based on differential correlation in a communication system according to another embodiment of the present invention. The method of FIG. 7 is similar to the method of FIG. 2, and a difference there between is that in the method of FIG. 7, the acquisition step S10 further includes steps S710-S760. To improve a search efficiency, while the check step S20 is executed, the step S710 of the acquisition step S10 is simultaneously executed.

Referring to FIG. 7, in the step S240, if the index J is equal to one of the indexes $I_1$-$I_N$, the step S710 is executed to determine whether a first counting value $N_{ACQ}$ is an initial value 0. If the first counting value $N_{ACQ}$ is 0, P=$J_T$ (step S720), and the first counting value $N_{ACQ}$ is accumulated by 1 (i.e. $N_{ACQ}=N_{ACQ}+1$, step S730). Then, the step S760 is executed to determine whether the first counting value $N_{ACQ}$ reaches a second threshold $C_{ACQ\_FRM}$. If a determination result of the step S760 is negative, the frame searching unit 120 repeats the step S210 to search a plurality of the correlation values of the next search window $W_{T+1}$.

If it is determined that the first counting value $N_{ACQ}$ is not equal to the initial value 0 in the step S710, a step S740 is executed to determine whether the index $J_T$ is equal to P. If a determination result of the step S740 is affirmative, the step S730 is executed, i.e. $N_{ACQ}=N_{ACQ}+1$. If the determination result of the step S740 is negative, a step S750 is executed, i.e. P=$J_T$. After the step S750 is completed, the step S760 is executed to determine whether the first counting value $N_{ACQ}$ reaches the second threshold $C_{ACQ\_FRM}$. If the first counting value $N_{ACQ}$ reaches the second threshold $C_{ACQ\_FRM}$, it is determined that the corresponding position of the index J is the header position, and therefore the search is determined to be successful.

In summary, in the present invention, one or multiple maximum correlation values are searched from the prior search window, and a correlation value greater than the first threshold is obtained from the posterior search window. Then, indexes $I_1$-$I_N$ of the maximum prior-window correlation values are compared to the index J of the posterior-window correlation value greater than the first threshold. According to a relationship of the indexes J and $I_1$-$I_N$, the header position can be quickly searched. Then, the index J is used to perform the check step S20, so as to confirm that a position of the index J is the header position.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A frame synchronization method based on differential correlation in a communication system, comprising:
   performing a correlation analysis by using a sync word in a first search window and a second search window, wherein the first window is placed before the second window, for respectively obtaining a plurality of first-window correlation values and a plurality of second-window correlation values;
   selecting N maximum correlation values from the first-window correlation values, wherein indexes of the maximum correlation values are $I_1$-$I_N$, and N is an integer greater than 0;
   comparing the second-window correlation values to a first threshold;
   defining an index of the second-window correlation value as J if the second-window correlation value is greater than the first threshold; and
   using the index J to perform a check step if the index J is equal to one of the indexes $I_1$-$I_N$, so as to confirm that a position of the index J is a header position, wherein the check step comprises:
   performing at least one pilot analysis in the second search window according to the index J, so as to obtain a pilot correlation accumulating value; and
   confirming that the position of the index J is the header position if the pilot correlation accumulating value reaches a third threshold.

2. The frame synchronization method based on differential correlation in the communication system as claimed in claim 1, further comprising:
   increasing a first counting value by 1 if the index J is equal to one of the indexes $I_1$-$I_N$; and
   confirming that the position of the index J is the header position if the first counting value reaches a second threshold.

3. A frame synchronization apparatus based on differential correlation in a communication system, comprising:
   a differential detector, for receiving a baseband signal, and performing a correlation analysis by using a sync word in a first search window and a second search window, wherein the first window is placed before the second window, for respectively obtaining a plurality of first-window correlation values and a plurality of second-window correlation values; and
   a frame searching unit, for selecting N maximum correlation values from the first-window correlation values, wherein indexes of the maximum correlation values are $I_1$-$I_N$, and N is an integer greater than 0; comparing the second-window correlation values to a first threshold, and defining an index of the second-window correlation value as J if the second-window correlation value is greater than the first threshold; and determining whether the index J is equal to one of the indexes $I_1$-$I_N$; and wherein the frame searching unit includes a check step unit for using the index J to confirm that a position of the index J is a header position if the index J is equal to one of the indexes $I_1$-$I_N$, wherein the check step unit comprises:
   a first delayer, delaying and outputting a baseband signal;
   a conjugator, calculating and outputting a conjugate complex of the baseband signal;
   a first multiplier, receiving output of the first delayer and the conjugator and performing a multiplication operation; and a first correlation analysis unit, receiving output of the first multiplier and performing correlation analysis of a plurality of pilots to output a first pilot correlation accumulating value.

4. The frame synchronization apparatus based on differential correlation in the communication system as claimed in claim 3, wherein if the index J is equal to one of the indexes $I_1$-$I_N$, the frame searching unit increases accumulates a first counting value by 1, and if the first counting value reaches a second threshold, the frame searching unit confirms that the position of the index J is the header position.

5. The frame synchronization apparatus based on differential correlation in the communication system as claimed in claim 3, wherein the first correlation analysis unit comprises:

a second multiplier, multiplying an output of the first multiplier with a sample of a pilot;

an adder, adding a correlation accumulating value with the output of the second multiplier;

a first multiplexer, determining whether or not to transmit the output of the adder according to a first control signal;

a second delayer, having a input terminal connected to a output terminal of the first multiplexer, and a output terminal providing the correlation accumulating value to the adder;

a third multiplier, calculating a square of the correlation accumulating value; and a second multiplexer, determining whether or not to transmit the output of the third multiplier according to a second control signal, wherein the second multiplexer outputs the first pilot correlation accumulating value.

6. The frame synchronization apparatus based on differential correlation in the communication system as claimed in claim 3, wherein the check step unit further comprises:

a second correlation analysis unit, receiving the output of the first multiplier and performing correlation analysis of a plurality of pilots after the spectrum inversion to output a second pilot correlation accumulating value; and a third multiplexer, selecting and outputting a greater one of the first pilot correlation accumulating value and the second pilot correlation accumulating value.

7. A frame synchronization method based on differential correlation in a communication system, comprising:

performing a correlation analysis by using a sync word in a first search window and a second search window, wherein the first window is placed before the second window, for respectively obtaining a plurality of first-window correlation values and a plurality of second-window correlation values;

selecting N maximum correlation values from the first-window correlation values, wherein indexes of the maximum correlation values are $I_1$-$I_N$, and N is an integer greater than 0;

comparing the second-window correlation values to a first threshold;

defining an index of the second-window correlation value as J if the second-window correlation value is greater than the first threshold; and using the index J to perform a check step if the index J is equal to one of the indexes $I_1$-$I_N$, so as to confirm that a position of the index J is a header position, wherein the check step comprises:

performing the correlation analysis by using the sync word after L symbols from the position of the index J, so as to obtain a header correlation value, wherein L is a length of the first search window or the second search window;

increasing a second counting value by 1 if the header correlation value is greater than a fourth threshold; and confirming that the position of the index J is the header position if the second counting value reaches a fifth threshold.

8. The frame synchronization method based on differential correlation in the communication system as claimed in claim 7, further comprising:

increasing a first counting value by 1 if the index J is equal to one of the indexes $I_1$-$I_N$; and confirming that the position of the index J is the header position if the first counting value reaches a second threshold.

9. The frame synchronization method based on differential correlation in the communication system as claimed in claim 7, wherein the check step further comprises:

increasing a third counting value by 1 if the header correlation value is less than a sixth threshold, wherein the sixth threshold is less than the fourth threshold; and confirming that the position of the index J is not the header position if the third counting value reaches a seventh threshold.

* * * * *